US011314514B2

(12) United States Patent
Stephens et al.

(10) Patent No.: US 11,314,514 B2
(45) Date of Patent: Apr. 26, 2022

(54) VECTOR LENGTH QUERYING INSTRUCTION

(71) Applicant: ARM Limited, Cambridge (GB)

(72) Inventors: Nigel John Stephens, Cambridge (GB); Grigorios Magklis, Cambridge (GB); Alejandro Martinez Vicente, Cambridge (GB); Nathanael Premillieu, Antibes (FR)

(73) Assignee: Arm Limited, Cambridge (GB)

( * ) Notice: Subject to any disclaimer, the term of this patent is extended or adjusted under 35 U.S.C. 154(b) by 400 days.

(21) Appl. No.: 15/741,303

(22) PCT Filed: Jun. 23, 2016

(86) PCT No.: PCT/EP2016/064500
§ 371 (c)(1),
(2) Date: Jan. 2, 2018

(87) PCT Pub. No.: WO2017/021055
PCT Pub. Date: Feb. 9, 2017

(65) Prior Publication Data
US 2018/0196673 A1 Jul. 12, 2018

(30) Foreign Application Priority Data

Jul. 31, 2015 (EP) .................................... 15386026

(51) Int. Cl.
*G06F 1/00* (2006.01)
*G06F 9/30* (2018.01)
(52) U.S. Cl.
CPC ........ *G06F 9/30149* (2013.01); *G06F 9/3001* (2013.01); *G06F 9/30003* (2013.01); *G06F 9/3004* (2013.01); *G06F 9/30036* (2013.01)

(58) Field of Classification Search
CPC .................................................. G06F 9/30149
See application file for complete search history.

(56) References Cited

U.S. PATENT DOCUMENTS

| 4,745,547 | A | 5/1988 | Buchholz et al. |
| 5,537,606 | A | 7/1996 | Byrne |

(Continued)

FOREIGN PATENT DOCUMENTS

| CN | 101083525 | 12/2007 |
| CN | 101535945 | 9/2009 |

(Continued)

OTHER PUBLICATIONS

ARM A64 Instruction Set Architecture, Circa 2010, pp. 1700, 1701 (Year: 2010).*

(Continued)

*Primary Examiner* — Hyun Nam
(74) *Attorney, Agent, or Firm* — Nixon & Vanderhye P.C.

(57) ABSTRACT

A data processing system 2 supporting vector processing operations uses scaling vector length querying instructions. The scaling vector length querying instructions return a result which is dependent upon a number of elements in a vector for a variable vector element size specified by the instruction and multiplied by a scaling value specified by the instruction. The scaling vector length querying instructions may be in the form of count instructions, increment instructions or decrement instructions. The instructions may include a pattern constraint applying a constraint, such as modulo(M) or power of 2 to the partial result value representing the number of vector elements provided for the register element size specified for the instruction.

13 Claims, 6 Drawing Sheets

(56) References Cited

U.S. PATENT DOCUMENTS

Figure 1:
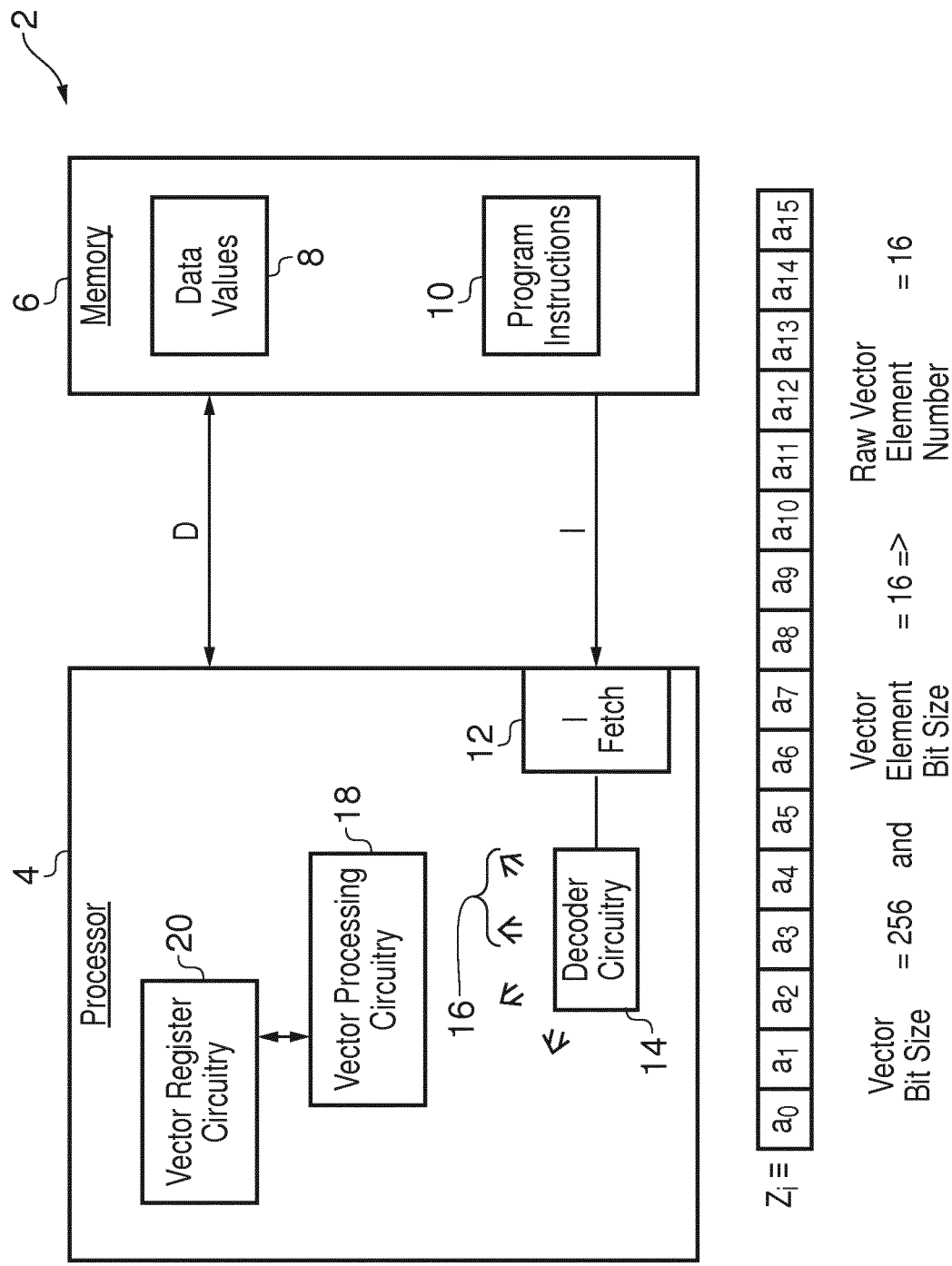

| | | | | |
|---|---|---|---|---|
| 7,917,302 | B2* | 3/2011 | Rognes | G16B 30/00 702/20 |
| 10,437,600 | B1* | 10/2019 | Kohn | G06F 9/30036 |
| 2002/0130874 | A1* | 9/2002 | Baldwin | G06F 9/30145 345/506 |
| 2004/0073773 | A1* | 4/2004 | Demjanenko | G06F 9/3853 712/7 |
| 2011/0145543 | A1 | 6/2011 | Damron | |
| 2011/0158310 | A1* | 6/2011 | Sriram | H04N 19/44 375/240.01 |
| 2012/0124332 | A1* | 5/2012 | Yi | G06F 9/30149 712/3 |
| 2012/0284487 | A1* | 11/2012 | Saha | G06F 9/3001 712/7 |
| 2014/0115301 | A1* | 4/2014 | Sanghai | G06F 9/30065 712/220 |
| 2014/0207838 | A1* | 7/2014 | Danne | G06F 1/03 708/235 |
| 2014/0289502 | A1* | 9/2014 | Gonion | G06F 9/30036 712/222 |
| 2015/0106596 | A1* | 4/2015 | Vorbach | G06F 15/7814 712/221 |
| 2018/0129506 | A1* | 5/2018 | Hughes | G06F 9/30036 |

FOREIGN PATENT DOCUMENTS

| | | |
|---|---|---|
| CN | 101901248 | 12/2010 |
| CN | 103020018 | 4/2013 |
| CN | 103105775 | 5/2013 |
| EP | 0 205 809 | 12/1986 |
| JP | S61-33547 | 2/1986 |
| TW | 201020805 | 6/2010 |
| TW | 201439902 | 10/2014 |
| WO | WO 2006/117562 | 11/2006 |
| WO | 2013/086380 | 6/2013 |
| WO | WO 2013/095558 | 6/2013 |

OTHER PUBLICATIONS

Professor David A. Patterson, "Lecture 6: Vector Processing", 1996 (Year: 1996).*
Aldakheel et al., "Vector Processors", 2012, UIC (Year: 2012).*
International Search Report and Written Opinion of the ISA for PCT/EP2016/064500, dated Oct. 10, 2016, 13 pages.
Extended Search Report for EP 15386026.7, dated May 23, 2016, 8 pages.
Office Action for JP Application No. 2018-503589 dated Aug. 14, 2020 and English translation, 5 pages.
Office Action for TW Application No. 105122825 dated Aug. 24, 2020 and English translation, 16 pages.
Office Action for IN Application No. 201817003442 dated Jun. 30, 2021, 6 pages.
First Office Action for CN Application No. 201680044118.1 dated Jul. 14, 2021 and English translation, 9 pages.
Notice of Allowance and Search Report for CN Application No. 201680044118.1 dated Feb. 14, 2022 and English translation, 8 pages.

* cited by examiner

{ type of vector length querying instruction } { vector element size } { (input value &) destination register for result value } { pattern constraint } { scaling value }

⇓ ⇓ ⇓ ⇓ ⇓

CNT    B    Xd    All    1-8
INC    H           2N
DEC   W          Modulo(N)
        D             ⋮ e.g.  INCW $X_4$, All, #4

FIG. 2

| Vector Bit Size | Vector Element Bit Size | Pattern Constraint | Scaling Value | Instruction Type | Input Value | Result Value |
|---|---|---|---|---|---|---|
| 128 | 8 | All | 1 | Count | 0 | 16 |
| 128 | 8 | All | 4 | Count | 0 | 64 |
| 256 | 8 | All | 2 | Count | 0 | 64 |
| 256 | 32 | All | 2 | Count | 0 | 16 |
| 256 | 32 | Multiple of 3 | 2 | Count | 0 | 12 |
| 256 | 32 | Power of 8 | 2 | Count | 0 | 8 |
| 256 | 32 | All | 2 | Increment | 32 | 48 |
| 256 | 32 | All | 2 | Decrement | 32 | 16 |
| 512 | 8 | All | 8 | Count | 0 | 512 |
| 384 | 16 | Power of 2 | 2 | Increment | 48 | 80 |
| 512 | 32 | Multiple of 5 | 5 | Decrement | 90 | 10 |

FIG. 3

VECTOR LENGTH QUERYING INSTRUCTION

This application is the U.S. national phase of International Application No. PCT/EP2016/064500 filed Jun. 23, 2016, which designated the U.S. and claims priority to EP Patent Application No. 15386026.7 filed Jul. 31, 2015, the entire contents of each of which are hereby incorporated by reference.

This disclosure relates to the field of data processing systems. More particularly, this disclosure relates to data processing systems supporting vector processing.

It is known to provide data processing systems which support processing of vector operands comprising a plurality of vector elements. The number of bits within a vector register is conventionally defined by the processor architecture concerned. The number of bits in the vector register may be divided between vector elements of different sizes resulting in different numbers of vector elements being provided by a given vector register.

According to at least some embodiments of the disclosure there is provided apparatus for processing data comprising processing circuitry to perform vector processing operations; and decoder circuitry to decode program instructions to generate control signals to control said processing circuitry to perform said vector processing operations; wherein said decoder circuitry is responsive to a scaled vector length querying instruction to control said processing circuitry to return a result value dependent upon a vector length used by said apparatus when performing said vector processing operation multiplied by a scaling value specified by said scaled vector length querying instruction.

According to at least some embodiments of the disclosure there is provided apparatus for processing data comprising processing means for perform vector processing operations; and decoder means for decoding program instructions to generate control signals to control said processing circuitry to perform said vector processing operations; wherein said decoder means is responsive to a scaled vector length querying instruction to control said processing means to return a result value dependent upon a vector length used by said apparatus when performing said vector processing operation multiplied by a scaling value specified by said scaled vector length querying instruction.

According to at least some embodiments of the disclosure there is provided a method of processing data comprising decoding a scaled vector length querying instruction to control processing circuitry to return a result value dependent upon a vector length used when performing a vector processing operation multiplied by a scaling value specified by said scaled vector length querying instruction.

Figure 4:
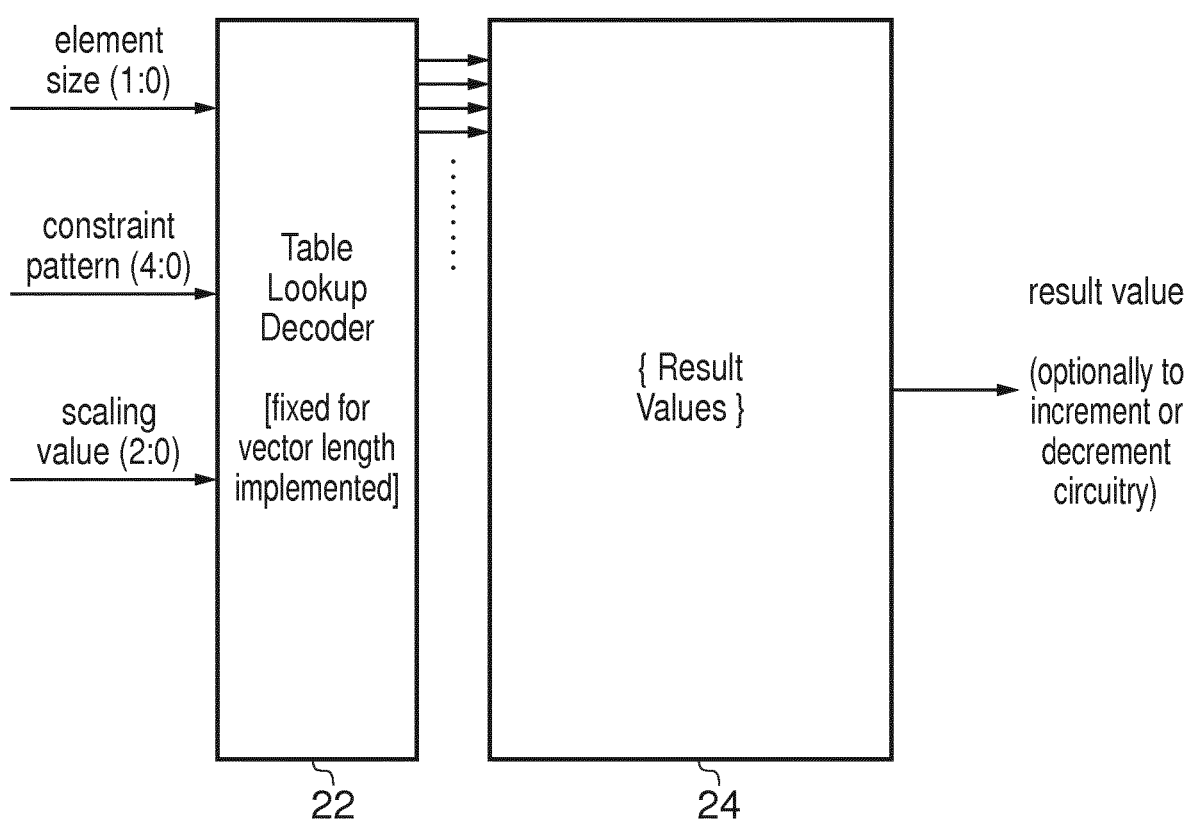
Figure 5:
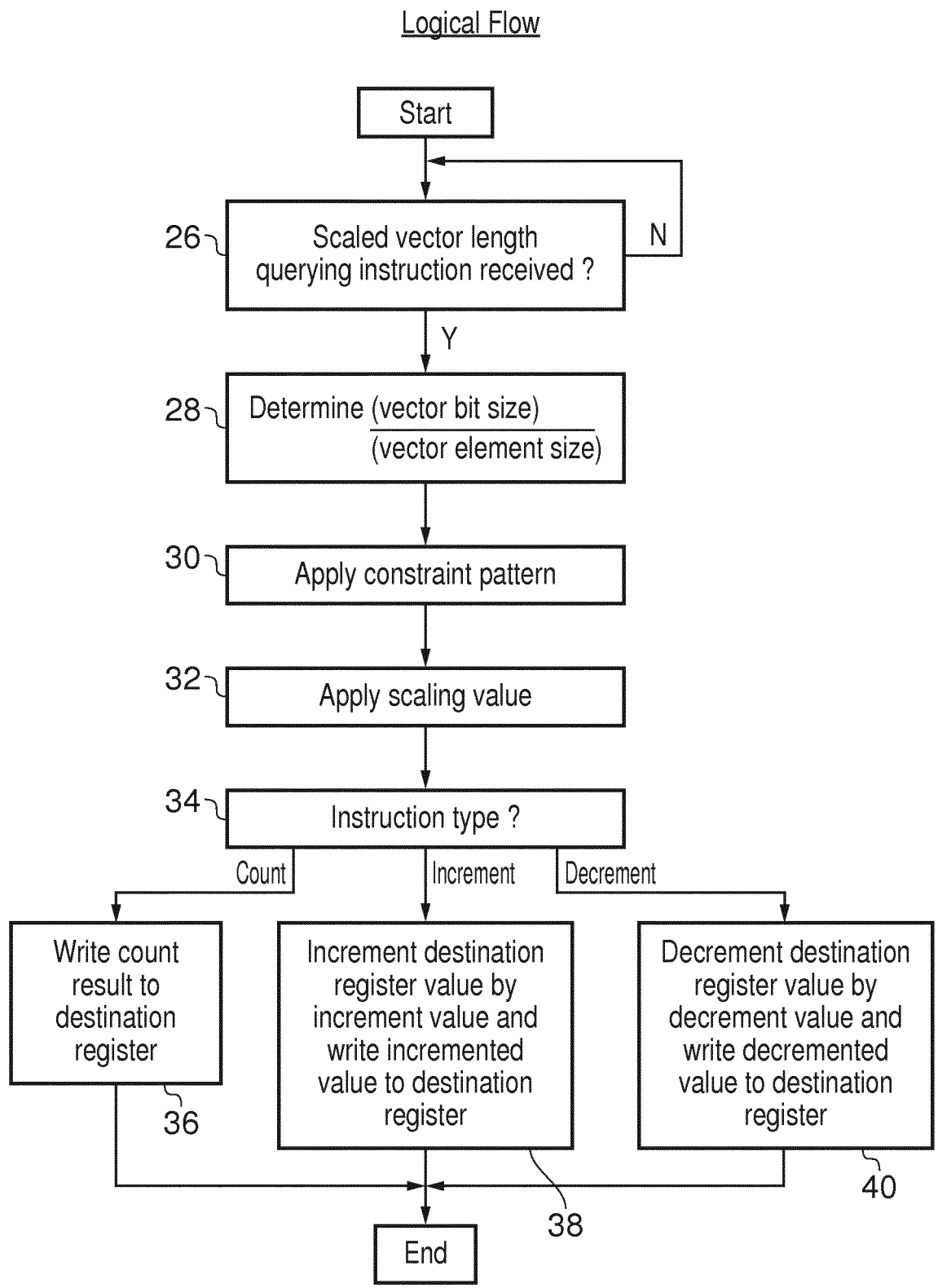
Figure 6:
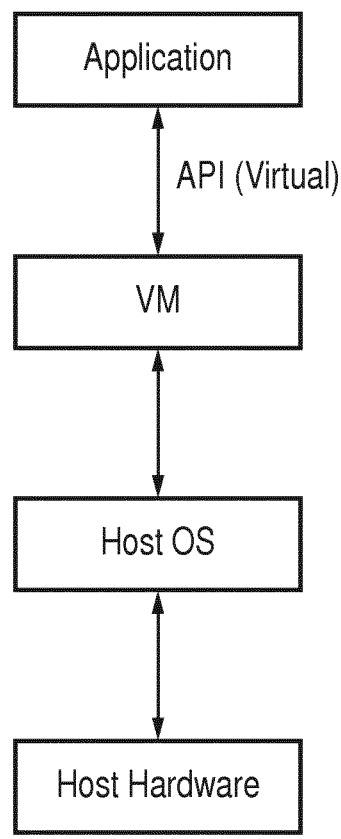

Example embodiments will now be described, by way of example only, with reference to the accompanying drawings in which:

FIG. 1 schematically illustrates a data processing system supporting vector processing;

FIG. 2 schematically illustrates plurality of different forms of scaling vector length querying instruction;

FIG. 3 schematically illustrates examples of the behaviour of different types of scaling vector length querying instruction of FIG. 2;

FIG. 4 schematically illustrates a look-up table implementation for creating a result value in response to a scaling vector length querying instruction;

FIG. 5 is a flow diagram schematically illustrating the behaviour of a scaling vector length querying instruction; and FIG. 6 schematically illustrates a virtual machine implementation.

FIG. 1 schematically illustrates a data processing system 2 comprising a processor 4 coupled to a memory 6 storing data values 8 and program instructions 10. The processor 4 includes an instruction fetch unit 12 for fetching program instructions 10 from the memory 6 and supplying the fetch program instructions to decoder circuitry 14. The decoder circuitry 14 decodes the fetched program instructions and generates control signals 16 to control vector processing circuitry 18 to perform vector processing operations upon vector registers stored within vector register circuity 20 as specified by decoded vector instructions. It will be appreciated that in practice the processor 4 will typically contain many more circuit elements and that these have been omitted from the drawings.

FIG. 1 also schematically illustrates an example vector register $Z_i$ which has a vector bit size of 256 in this example. The vector register $Z_i$ is formed of 16 vector elements $a_0$-$a_{15}$. Each of these vector elements has a vector bit size of 16 bits and accordingly the vector element number within the vector register $Z_i$ is 16. The vector element size is a variable which may be specified by a vector instruction being decoded. For example, a vector instruction may be encoded to specify that the vector elements are bytes, half words, words, or double words (8, 16, 32, 64 bits respectively). Depending upon the vector element bit size, the vector element number within the vector register $Z_i$ will vary. Thus, for a vector register $Z_i$ formed of 256 bits, this may support sixteen 16-bit vector elements, eight 32-bit vector elements or four 64-bit vector elements.

A given implementation of the processor 4 will contain vector register circuitry 20 supporting vector registers $Z_i$ of a given bit size. However, a different implementation of the processor 4 using the same instruction set architecture may support vector registers of a different size, e.g. 512 bits, 384 bits, 1024 bits, etc.

As a way of enabling program code including vector instructions to adapt to vector register circuitry 20 providing vector registers $Z_i$ of different sizes without requiring any or significant modification, there is provided one or more scaling vector length querying instructions. These scaling vector length querying instructions return a result value which is dependent upon a number of elements in a vector for a variable vector element size (e.g. byte, half word, word or double word) specified by the scaling vector length querying instruction and multiplied by a scaling value specified by the scale vector length querying instruction. Such scaling vector length querying instructions are able to return a result which can take account of the particular vector register size of an implementation and also take account via the a degree of program loop rolling which may be provided by the vector code being implemented. The scaling value may be provided in the form of a constant integer value which is encoded within the scaling vector length querying instruction (e.g. an immediate value within the instruction).

FIG. 2 schematically illustrates a variety of different forms of scaling vector length querying instruction. In particular, the type of vector length querying instruction may be a count instruction, an increment instruction or a decrement instruction. Further types of instruction which are scaling vector length querying instructions are also possible. The scaling vector length querying instruction additionally specifies the vector elements size in respect of which the result value is to be determined. Accordingly, the vector element size may be a byte B, a half word H, a word W or a double word D. The scaling vector length querying instruction also specifies a scalar register $X_d$ which may serve as a source for an input operand value to the instruction and as the destination for the result value to be written.

The final two parameters within the scaling vector length querying instruction illustrated in FIG. 2 are a field specifying a pattern constraint subject to which the vector length used by the processing apparatus, and in dependence upon which the result value of the scaling vector length querying instruction is returned, may be specified. The vector pattern constraint can take a variety of different forms. The constraint may be, for example, that the maximum value provided by the apparatus is a multiple of a specified value M, e.g. the value for the number of vector elements is constrained to be a multiple of the value M (modulo(M)). Another example of a constraint pattern is that the maximum value returned for the number of vector elements supported should be constrained to be a power of two, e.g. 2, 4, 8, 16, 32, etc. Another example of a constraint pattern is that no constraint is applied to the maximum value of the supported number of elements beyond the physical size of the vector register $Z_i$. Accordingly, if the vector register is 256 bits in length, and the element size is 16 bits, then with a constraint of "All" in this manner, the result value will be returned on the basis that the number of vector elements is 16.

A final parameter specified by the scale vector length querying instruction is the scaling value. This may be a constant integer value encoded within the scaling vector length querying instruction itself has an immediate value. While this scaling value could have a wide variety of values, it has been found that scaling values in the range of 1 to 8 (inclusive) are able to support the majority of degrees of loop unrolling commonly found whilst preserving instruction bit space used to encode the scaling vector length querying instructions.

FIG. 3 schematically illustrates result values which may be returned for some example scaling vector length querying instructions. The columns illustrated are the vector bit size (i.e. the bit size of the vector register $Z_i$), the vector element bit size (e.g. byte, half word, word, double word), the vector pattern constraint (e.g. A, modulo(M), power of 2, etc), the scaling value (e.g. a constant value encoded within the instruction itself in a range of 1 to 8 inclusive), and the instruction type (e.g. count, increment, decrement). The input value may be deemed to be a "0" in respect of count instructions and may be a value provided by the input register $X_d$ in the case of increment and decrement instructions.

Considering the first row illustrated in FIG. 3, this specifies a vector bit size of 128. The vector element bit sizes 8. Accordingly, an unconstrained maximum vector element count is 16. The pattern constraint for this row is "All" and accordingly this corresponds to the unconstrained pattern. The scaling of the first row is "1" and so the result is not changed by scaling. The instruction type is a count and accordingly a straightforward count of the number of byte sized vector elements within the vector register is provided and equals 16.

A more complex example is given in the fifth row. In this case the vector bit size is 256 and the vector element bit size is 32. This indicates an unconstrained number of supported vector elements as 8. However, the pattern constraint is that the number of vector elements that should be number supported should be a multiple of 3. Accordingly, the pattern constraint reduces the number of vector elements considered as the maximum of supported to 6. The scaling value of the fifth row is 2 and the instruction type is a count and accordingly the result value is twice the outcome of the pattern constraint, namely 12.

A further example is given in the tenth row. In this row the vector bit size is 384 and the vector element bit size is 16. This would indicate that the raw vector element number supported by the vector register would be 24. However, the pattern constraint applying in this row is that the vector count supported should be a power of 2 and accordingly the value the maximum number of vector elements of bit size 16 supported is considered to be 16. A scaling factor 2 is applied. Accordingly, the scaled partial result value is 32. The instruction type is an increment type of scaling vector length querying instruction and the input value to the increment as held within the scaler register $X_d$ is 48. This produces a result value (incremented value) of 80.

When this scale vector length querying instruction is a scaled count instruction then this returns a count value dependent upon the number of elements supported multiplied by the scaling value. When the scale vector length querying instruction is a scaled increment instruction, then this returns an increment result value which is dependent upon an input value to be incremented (by a value determined depending upon the vector bit size, the vector element bit size, the pattern constraint and the scaling value). In a similar way, when the scale vector length querying instruction is a scaled decrement instruction, then this returns a decrement result value dependent upon an input value to be decremented.

FIG. 4 illustrates an example implementation of circuitry for determining a result value in response to a scale vector length querying instruction. This implementation is in the form of a look-up table which comprises a table address decoder 22 indexing into a table of result values 24. Parameters (fields) from the scaling vector length querying instruction are supplied as inputs to the table decoder 22. These fields include the element size (2 bits), the constraint pattern applied (5 bits), and the scaling value applied (3 bits). The table address decoder 22 is of a fixed form for a particular implementation, i.e. for a particular vector length implemented. The table address decoder 22 generates in response to the input signal supplied to it a 1-hot output to select a result value from the table of result values 24 with this result value then being supplied to increment or decrement circuitry (adder or subtracter) if the scaling vector length querying instruction is a scaling increment instruction or a scaling decrement instruction respectively.

FIG. 5 is a flow diagram schematically illustrating the logical flow of the handling of scaling vector length querying instructions. It will be appreciated that in practice such processing is typically carried out in parallel and the individual steps illustrated in FIG. 5 may in fact be carried out in parallel. At step 26 processing waits until a scaling vector length querying instruction is received. Step 28 then determines the raw maximum number of vector elements supported by the vector register implementation concerned for the vector element size specified. Step 30 applies the constraint pattern (if any) specified by the scale vector length querying instruction. Step 32 scales the partial result determined by applying the constraint pattern at 26. If the instruction type is a count instruction, then step 36 writes the count result to the destination register. If the instruction type is increment, then step 38 increments the destination register value already held by the increment value determined at step 32 and the incremented result is written into the destination register. If the instruction type determined at step 34 is decrement, then step 40 decrements the destination register value by a decrement value calculated at step 32 and writes the result into the destination register.

FIG. 6 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. Apparatus for processing data comprising:
    processing circuitry to perform vector processing operations; and
    decoder circuitry to decode program instructions to generate control signals to control said processing circuitry to perform said vector processing operations; wherein
    said decoder circuitry is responsive to a scaled vector length querying instruction, specifying a vector element size and a scaling value, to control said processing circuitry to return a scalar result value dependent upon a number of vector elements of said specified vector element size in a predetermined vector length multiplied by said specified scaling value, said predetermined vector length representing a length of a vector register useable by said apparatus;
    said scaled vector length querying instruction includes one or more further parameters and said scalar result value returned by said processing circuitry is dependent upon said one or more further parameters; and
    said one or more further parameters include a vector pattern constraint subject to which said vector length used by said apparatus is determined.

2. Apparatus as claimed in claim 1, wherein said scaling value is a constant integer value encoded within said scaled vector length querying instruction.

3. Apparatus as claimed in claim 1, wherein said scaling value is in a range extending from 1 to 8 inclusive.

4. Apparatus as claimed in claim 1, wherein said vector element size is selected from one of 8 bits, 16 bits, 32 bits and 64 bits.

5. Apparatus as claimed in claim 1, wherein said vector pattern constraint specifies said number of elements is one of:
    a maximum value provided by said apparatus that is also a multiple of a specified value M;
    a maximum value provided by said apparatus that is also a power of two; and
    a maximum value provided by said apparatus.

6. Apparatus as claimed in claim 1, wherein said scaled vector length querying instruction is a scaled count instruction that returns a count result value dependent upon said number of elements multiplied by said scaling value.

7. Apparatus as claimed in claim 1, wherein said scaled vector length querying instruction is a scaled increment instruction that returns an increment result value dependent upon an input value to be incremented.

8. Apparatus as claimed in claim 1, wherein said scaled vector length querying instruction is a scaled decrement instruction that returns a decrement result value dependent upon an input value to be decremented.

9. Apparatus as claimed in claim 1, wherein said vector processing circuitry comprises a look-up table addressed in dependence upon said scaling value to at least partially determine said scalar result value.

10. Apparatus as claimed in claim 1, wherein said vector processing circuitry comprises a look-up table addressed in dependence upon said scaling value to at least partially determine said scalar result value, and said look-up table is addressed in dependence upon said one or more further parameters.

11. A computer program stored on a non-transitory storage medium for controlling a computer to provide a virtual machine execution environment corresponding to apparatus as claimed in claim 1.

12. A method of processing data comprising:
    decoding a scaled vector length querying instruction, specifying a vector element size and a scaling value, to control processing circuitry to return a scalar result value dependent upon a number of vector elements of said specified vector element size in a predetermined vector length multiplied by a scaling value, said predetermined vector length representing a length of a vector register used by an apparatus,
    wherein:
    said scaled vector length querying instruction includes one or more further parameters and said scalar result value returned by said processing circuitry is dependent upon said one or more further parameters; and
    said one or more further parameters include a vector pattern constraint subject to which said vector length used by said apparatus is determined.

13. Apparatus for processing data comprising:
    processing circuitry to perform vector processing operations; and
    decoder circuitry to decode program instructions to generate control signals to control said processing circuitry to perform said vector processing operations; wherein
    said decoder circuitry is responsive to a scaled vector length querying instruction, specifying a vector element size and a scaling value, to control said processing circuitry to return a scalar result value dependent upon a number of vector elements of said specified vector element size in a predetermined vector length multiplied by said specified scaling value, said predetermined vector length representing a length of a vector register useable by said apparatus;
    said scaled vector length querying instruction includes one or more further parameters and said scalar result value returned by said processing circuitry is dependent upon said one or more further parameters; and said vector processing circuitry comprises a look-up table addressed in dependence upon said scaling value to at least partially determine said scalar result value, and said look-up table is addressed in dependence upon said one or more further parameters.

* * * * *